(12) United States Patent
Nishi

(10) Patent No.: US 7,460,707 B2
(45) Date of Patent: Dec. 2, 2008

(54) IMAGE PROCESSING METHOD AND APPARATUS FOR RED EYE CORRECTION

(75) Inventor: Noriyuki Nishi, Wakayama-ken (JP)

(73) Assignee: Noritsu Koki Co., Ltd., Wakayama-shi (JP)

( * ) Notice: Subject to any disclaimer, the term of this patent is extended or adjusted under 35 U.S.C. 154(b) by 777 days.

(21) Appl. No.: 11/112,448

(22) Filed: Apr. 22, 2005

(65) Prior Publication Data
US 2005/0254725 A1    Nov. 17, 2005

(30) Foreign Application Priority Data
Apr. 23, 2004 (JP) ............................. 2004-128482

(51) Int. Cl.
*G06K 9/00* (2006.01)
*G06K 15/00* (2006.01)

(52) U.S. Cl. ..................................... 382/167; 358/3.26

(58) Field of Classification Search ................ 382/167, 382/117, 118, 190, 282, 168, 254; 358/3.26, 358/3.27, 1.9, 515, 518; 348/222, 239, 370, 348/371, 376, 576, 577; 396/158, 18, 287, 396/299

See application file for complete search history.

(56) References Cited

U.S. PATENT DOCUMENTS

| | | | |
|---|---|---|---|
| 6,292,574 B1 * | 9/2001 | Schildkraut et al. | 382/117 |
| 6,407,777 B1 * | 6/2002 | DeLuca | 348/576 |
| 6,577,751 B2 * | 6/2003 | Yamamoto | 382/117 |
| 6,631,208 B1 | 10/2003 | Kinjo et al. | |
| 6,700,619 B1 | 3/2004 | Hamamura | |
| 6,728,401 B1 * | 4/2004 | Hardeberg | 382/167 |
| 7,035,462 B2 * | 4/2006 | White et al. | 382/167 |
| 7,397,969 B2 * | 7/2008 | Enomoto et al. | 382/275 |

FOREIGN PATENT DOCUMENTS

| | | |
|---|---|---|
| EP | 0 911 759 A2 | 4/1999 |
| JP | 060-258732 | 9/1994 |
| JP | 2000-076427 | 3/2000 |

\* cited by examiner

*Primary Examiner*—Yon Couso
(74) *Attorney, Agent, or Firm*—Fulbright & Jaworski LLP

(57) ABSTRACT

An image processing apparatus for correcting red eye phenomenon in a photographic image is disclosed. The apparatus includes a fog degree calculating section for calculating a degree of red fog present in a face area, based on values of pixels included in the face area selected from the photographic image, a red eye correction degree determining section for determining a red eye correction degree based on the determined fog degree, a pupil area extracting section for extracting a pupil area from the face area, and a red eye correcting section for effecting a red eye correction on the pupil area based on the determined red eye correction degree.

21 Claims, 5 Drawing Sheets

IMAGE PROCESSING METHOD AND APPARATUS FOR RED EYE CORRECTION

This application claims priority from JP2004-128482 filed Apr. 23, 2004 herein incorporated by reference in its entirety

FIELD OF THE INVENTION

The present invention relates to an image processing technique for correcting a red eye phenomenon occurring in photographically recorded image data.

DESCRIPTION OF THE RELATED ART

In flash pictures of such subject as a human or an animal, there can occur a so-called red eye phenomenon resulting from reflection of the flash light off the blood vessels of the retina of the subject's eyes, causing the center of the pupils of the eyes to appear red or in a color different from the actual color thereof. With ever increasing popularity of digital cameras as well as film scanners for digitizing photographic image of a photographic film, various and numerous solutions have been proposed to tackle this problem by means of image processing technique. Of course, correction of red eye phenomenon is possible by a professional technique in which a skilled artisan manually corrects the color of each of pixels of the red eye to its correct color while observing these pixels on a monitor. However, this technique is unpopular since this is extremely troublesome and requires high skill on the part of the artisan. For this reason, there has been proposed an automatic method in which the pupil in the picture is detected by using e.g. a pattern recognition technique or a red portion is picked out from within the image and color change is made on this detected portion. In this case, however, for precise detection of red eye area, very complicated image processing technique is required and also the system implementing the technique tends to be very expensive.

According to another solution known from Japanese Patent Application "Kokai" No. 2000-76427 (paragraphs [0009] to [0011] and [0058] to [0071], and FIG. 10), a red eye portion is separated from a white eye portion and a skin color portion. In this, first, an area including the eye area having the color defect is designated. Then, for this designated area, the technique uses characteristics amounts comprising combination of e.g. brightness and reddishness and utilizes a fact that a trough is formed respectively between the red eye portion and the white eye portion and between the red eye portion and the skin color portion, so that the area is divided for each high point in the characteristics amount. In the red eye portion, the closer to the center of pupil, the stronger the reflection from the retina. So that, the brightness tends to decrease from the center to the peripheral portion, resulting in hill-like distribution of the brightness, including "catch light" in the eye. Also, in the case of an eye having bluish iris, there is formed a trough between a red eye portion and the iris in the magnitude of the redness. The above conventional technique utilizes these phenomena. That is to say, this technique is configured to achieve the separation of the red eye portion from the white eye portion and the skin color portion, based on the intensity distribution of color-related attribute, i.e. the redness, in the eye area. In the case of a human face photography taken with an insufficient amount of flash light, thus influenced significantly by a tungsten light of the room illumination, not only the pupils of the subject, but also the entire face thereof will have a reddish fog. Then, if the standard red eye correction is effected on such photography, this can result in undesirable enhancement of unnaturalness in the color balance between the pupil color subjected to the red eye correction and the color of the entire face, hence, leading to deterioration of the quality thereof as a human subject photography.

A still further solution is proposed by e.g. Japanese Patent Application "Kokai" No. 6-258732 (paragraphs [0006] to [0009] and [0019] to [0023], and FIG. 6). This solution comprises a technique for detecting a red eye portion in a photographed subject through extraction of a plurality of color component images unique to a face of a human subject. More particularly, from within a photographic image, at least either a low chroma area or low illumination area and a skin color area are extracted. Then, by using extracted signals, e.g. by effecting a logical AND operation thereon, an area including the subject's eye is extracted. Further, by using the extracted red signals, the red eye position is detected from this area including the eye, if a red eye phenomenon is present therein. Then, based on the red eye position data thus obtained, the red color in the red eye position is corrected to a normal color such as black color. With this technique, the eye area is automatically selected in advance. Hence, compared with the more conventional technique described above, it is more likely for this technique to effect the red eye correction in the case of the red fog present on the entire face including the pupils due to a factor other than the flash light. Namely, this technique does not contemplate avoidance of unnecessary red eye correction for a photographic image having red fog on an entire face of the subject which tends to occur in the case of photography under a tungsten illumination in particular. Thus, with this technique, the red eye correction can invite unexpected result.

SUMMARY OF THE INVENTION

In view of the above-described state of the art, a primary object of the present invention is to provide an improved red eye correction technique which allows for a red eye correction with maintaining color balance with an entire face of the subject or cancellation of the entire red eye correction, in the case of presence of red fog over an entire face of a subject in a photographic image obtained thereon with an insufficient flash light amount and under a reddish illumination such as a tungsten illumination.

For fulfilling the above-noted object, according to one aspect of the present invention, there is proposed a method for correcting red eye phenomenon in a photographic image, comprising the steps of:

calculating a degree of red fog present in a face area, based on values of pixels included in the face area selected from the photographic image;

determining a red eye correction degree based on the determined fog degree;

extracting a pupil area from the face area; and effecting a red eye correction on the pupil area based on the determined red eye correction degree.

With this construction, prior to effecting a red eye correction, the process first checks a degree of red fog, if any, in the face area due to effect of e.g. a tungsten illumination, based on values of pixels constituting the face area and determines a red eye correction degree (correction intensity) based on the determined fog degree. Thereafter, the process effects a red eye correction on the extracted pupil area in accordance with an extraction protocol well-known in the art. Therefore, in the case of a photographic image having a red fog over an entire face area due to an insufficient flash light amount under a tungsten illumination, the process either effects a red eye correction with an appropriately attenuated correction degree or does not effect any red eye correction at all. As a result, it is possible to avoid the above-described inconvenience in a human subject (face) photography due to unnecessary red eye correction.

As an easy and speedy method usable in the step of calculating the fog degree, the present invention proposes that said fog degree be a difference value between an average value of red component density values of the pixels included in the face area and an average value of blue component density values of the same. Namely, through extensive statistical study of a number of human face photographic images obtained under varied conditions, the present inventors have found a close relationship between the above difference value and a red fog degree. And, based on this finding, the inventors have successfully obtained a determining function for determining a red fog degree using this difference value as a parameter. More particularly, if this difference value is smaller than a lower limit value, then, it may be determined with substantially 100% probability that no red fog is present in the face area, so that if the pupil area has a reddish tint (i.e. red eye phenomenon), the process effects a red eye correction positively (i.e. with an intense correction degree). On the other hand, if the above difference values is greater than an upper limit value, it may be determined again with substantially 100% probability that a red fog is present in the face area (due to e.g. the effect of a tungsten illumination), so that the process does not effect any red eye correction at all since the correction, if effected, would result in deterioration, rather than improvement, in the photographic quality. Further, in the case of a difference value somewhere between the lower limit value and the upper limit value, the process can effect a red eye correction with such a correction degree as determined based on reasonably determined probability of fog presence.

Incidentally, one photographic image can include more than one faces (face areas). To cope with such case, the invention proposes two processing methods. According to one proposed method, the method determines the red eye correction degree and effects the red eye correction for each face area. This method is time-consuming, but most reliable. The other proposed method is to determine the red eye correction degree for one of the face areas and then effects the red eye correction for all the face areas based on the correction degree determined for that one face area. Namely, as it may be generally assumed that the influence of the red fog due to e.g. tungsten illumination is exerted to the entire photographic image, then, by applying a fog degree determined for one face (area) to all the faces (areas), there is achieved speediness of the process, although the reliability is compromised to some extent. Since selection of the process depends on desired photographic quality, advantageously, the method is configured to allow free selection between the two methods.

The present invention concerns also a program for causing a computer to execute the above-described red eye correction method as well as a medium storing such program therein.

According to a further aspect of the present invention, there is proposed an image processing apparatus for implementing the red eye correction method described above.

The apparatus comprises:

a fog degree calculating section for calculating a degree of red fog present in a face area, based on values of pixels included in the face area selected from the photographic image;

a red eye correction degree determining section for determining a red eye correction degree based on the determined fog degree;

a pupil area extracting section for extracting a pupil area from the face area; and a red eye correcting section for effecting a red eye correction on the pupil area based on the determined red eye correction degree.

Obviously, such image processing apparatus can achieve all the functions and effects described above for the red eye correcting method.

Further and other features and advantages of the present invention will become apparent upon reading the following detailed description of the preferred embodiments thereof with reference to the accompanying drawings.

DESCRIPTION OF THE PREFERRED EMBODIMENTS

Preferred embodiments of the present invention will be described in details with reference to the accompanying drawings.

Figure 1:
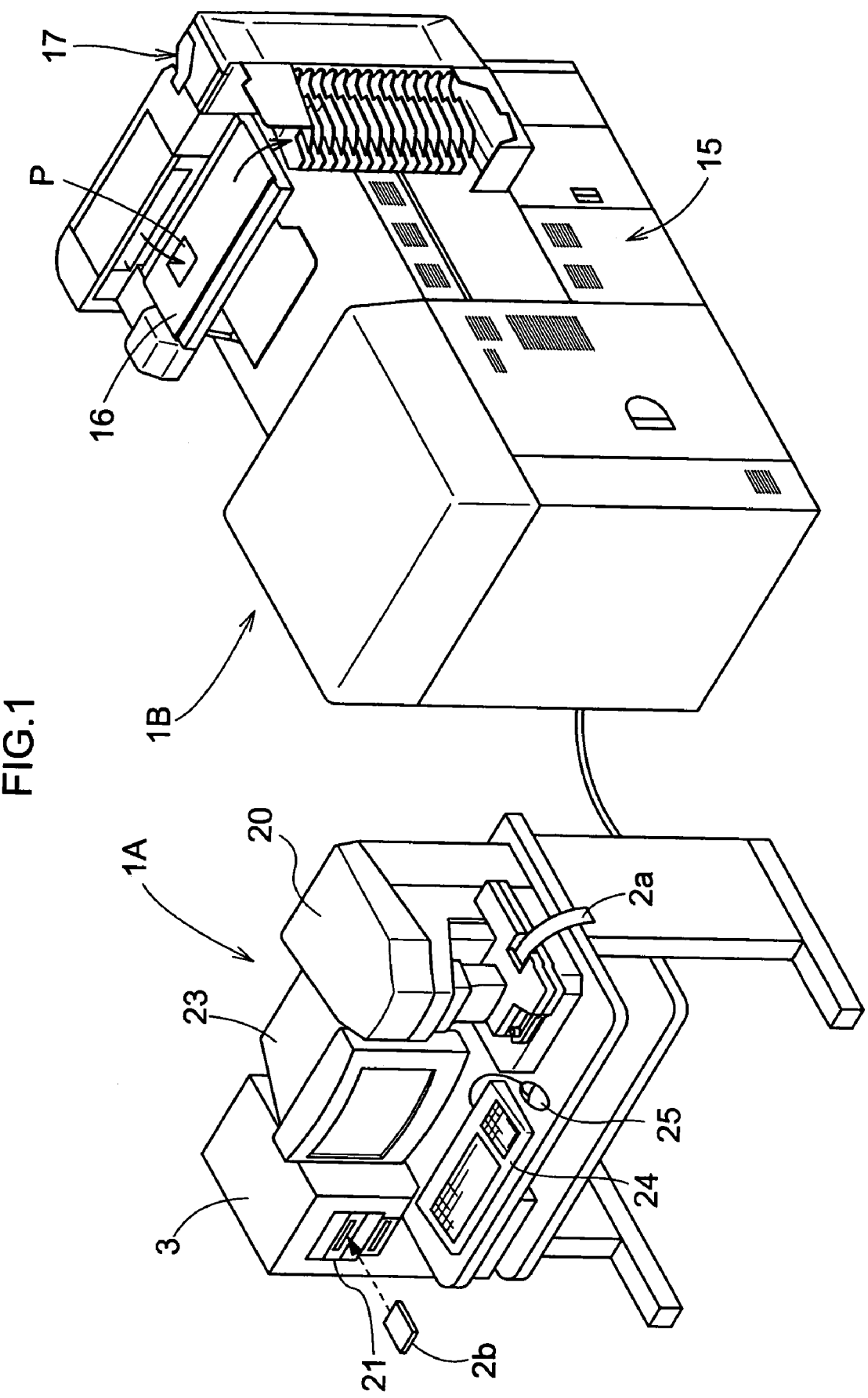
FIG. 1 is a view showing an outer appearance of a photographic printing system employing the red eye correcting technique according to the present invention.
Figure 2:
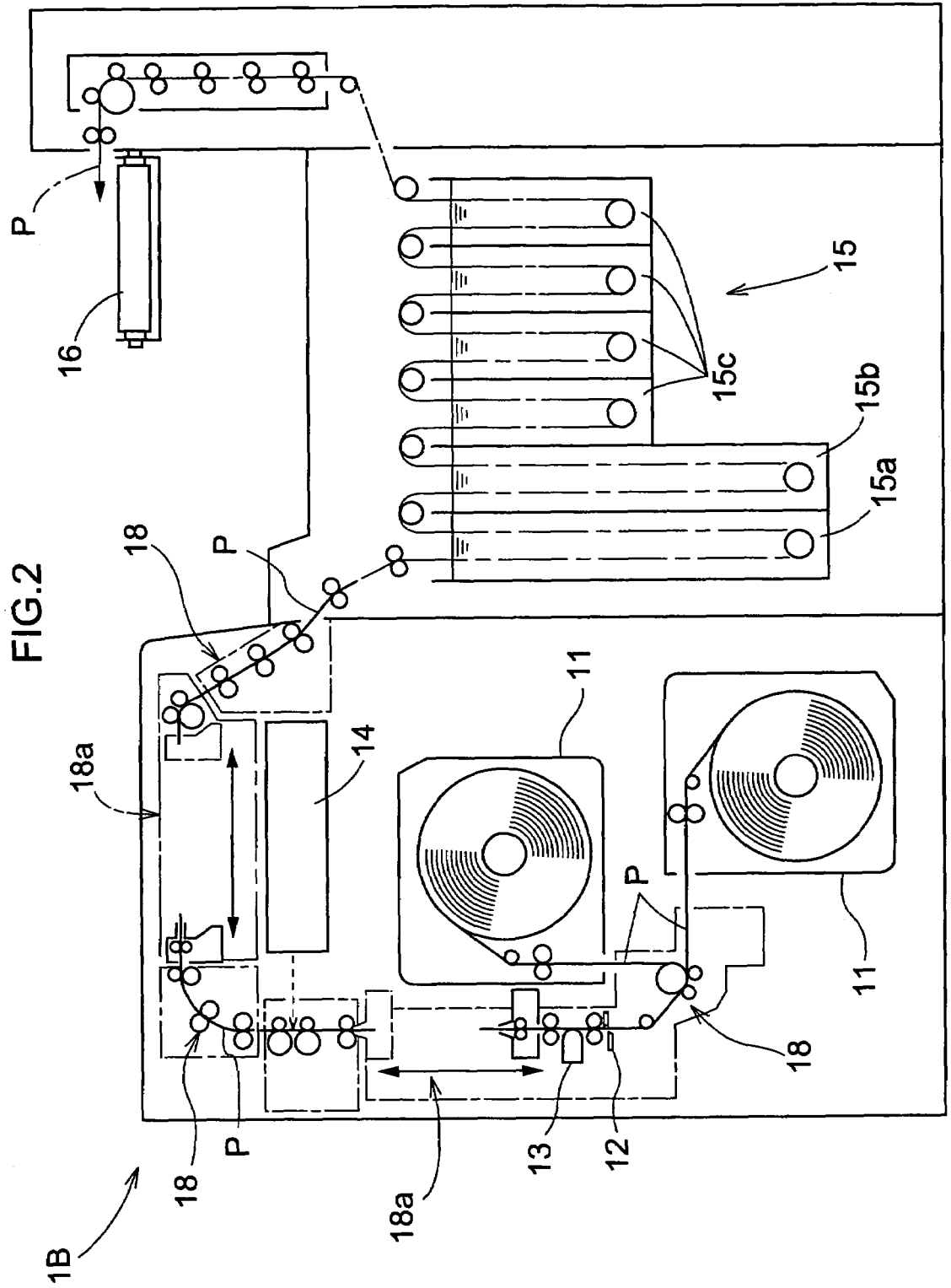
FIG. 2 is a diagram schematically showing a construction of a printing station of the photographic printing system.

FIG. 1 shows an outer appearance of a photographic printing system employing the red eye correction technique of the present invention. As shown, this printing system consists mainly of a printing station 1B as a photographic printer for effecting exposure and development on a print paper P and an operating station 1A for processing photographic images taken from a developed photographic film 2a or various image input media such as a memory card 2b for a digital camera and effecting production/transmission of print data to be used in the printing station 1B. This photographic printing system is known also as "digital mini-labo". As best understood from FIG. 2, in the printing station 1B, a print paper P stored in the form of a roll in either one of two print paper magazines 11 is drawn out and cut by a sheet cutter 12 to a print size strip. On this print paper P (or print size strip), a back printing unit 13 prints on its back face, color correction information and various print processing information such as color correction information, a frame number, and a print exposing unit 14 exposes a front face of each paper P with a photographically recorded image. Then, a plurality of such exposed print papers P are fed into a developing tank unit 15 having a plurality of developing solution tanks for their development. After being dried, the developed print papers P, i.e. photographic prints P, are conveyed by a transverse conveyer 16 to a sorter 17, by which the papers P are sorted according to each customer's order and stacked in a plurality of trays (see FIG. 1).

For transporting the print papers P at a speed adapted or suited for each of the above-described various operations, there is provided a print paper transporting mechanism 18. This print paper transporting mechanism 18 has a plurality of pinch transport roller pairs including chucker type print paper transport units 18*a* disposed before and after the print exposing unit 14 relative to the print paper transporting direction.

The print exposing unit 14 has line exposure heads for effecting irradiation of laser beams of three primary colors, R (red), G (green) and B (blue) along a main scanning direction of the print paper P which is being transported in a sub scanning direction, based on the print data sent from the operating station 1A. The developing solution tank unit 15 includes a color developing solution tank 15*a* which stores therein color developing solution, a bleaching/fixing solution tank 15*b* which stores therein bleaching/fixing solution and stabilizing solution tanks 15*c* which store stabilizing solutions therein.

At an upper position of a desk-like console of the operating station 1A, there is disposed a film scanner 20 for obtaining photographic image data (to be referred to as "photographic image" hereinafter except in special cases) from the respective photographically exposed frames of the photographic film 2*a*. Whereas, a media reader 21 for obtaining image data from various types of semiconductor memories, CD-R or the like is incorporated within a general-purpose personal computer which functions as a controller 3 for this photographic printing system. The general-purpose PC is connected also to a monitor 23 for displaying various kinds of information and a keyboard 24 and a mouse 25 which function as operation input devices (pointing devices) employed as an instruction inputting section when various settings or adjustments are to be effected.

Figure 3:
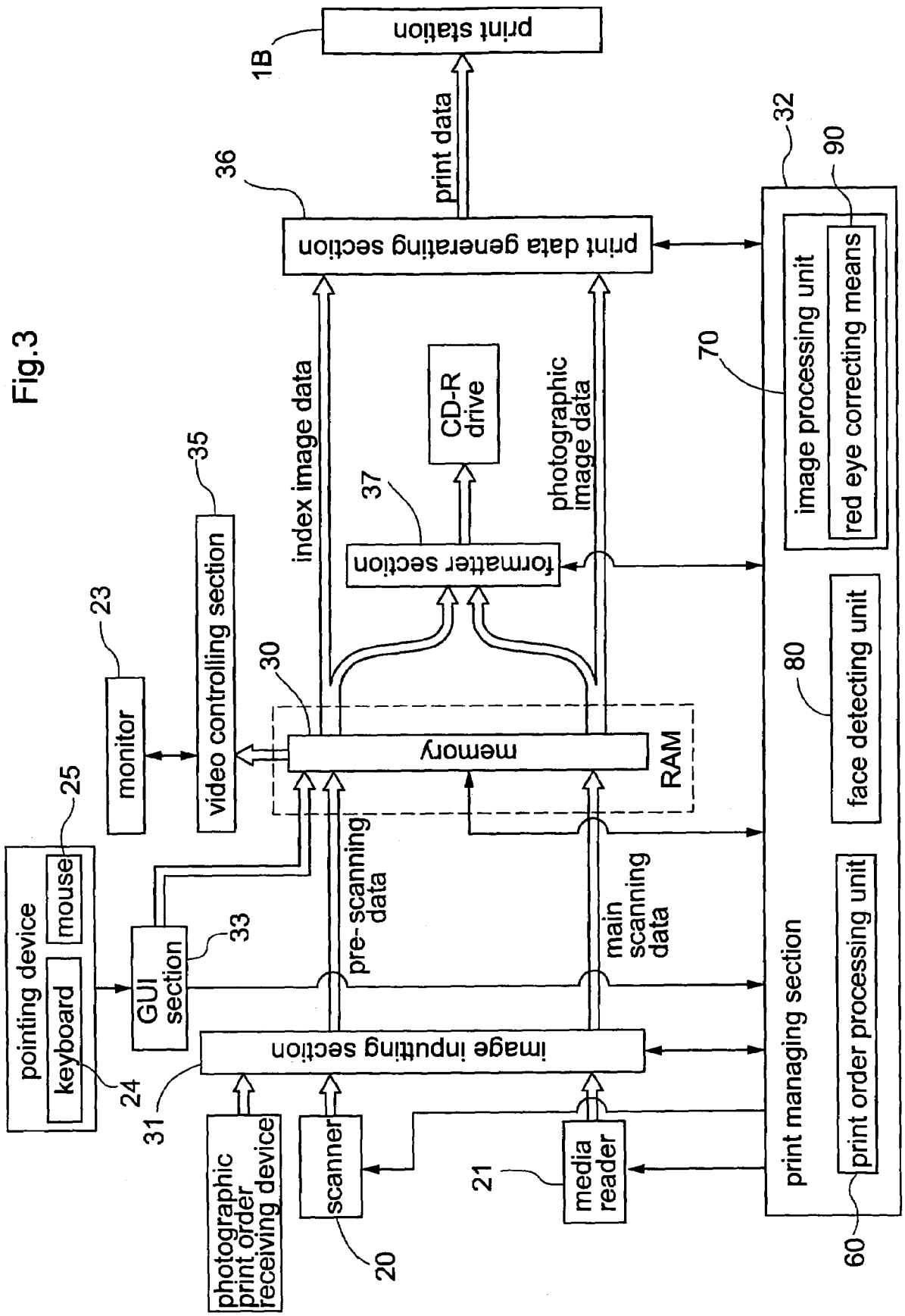
FIG. 3 is a functional block diagram for illustrating functional blocks or sections provided in a controller of the photographic printing system.

The controller 3 for the photographic printing system includes a CPU as a core component thereof and includes also various functional blocks or sections for effecting various operations of the photographic printing system realized in the form of hardware and/or software. Of these functional sections, as shown in FIG. 3, the following sections are of particular relevance to the present invention. An image inputting section 31 is provided for inputting the image data read by the scanner 20 or the media reader 21 and effecting any preparatory operation needed for a subsequence process. A GUI section 33 constitutes a graphic user interface (i.e. GUI) configured for creating a graphically assisted operation screen having various windows, various operation buttons or the like and generating control commands from user's operation inputs (via the keyboard 24, the mouse 25 or the like) effected through such graphic operation screen. A print managing section 32 effects e.g. an image processing operation on the image data transmitted from the image inputting section 31 to a memory 30 in order to generate desired print data according to a control command sent from the GUI section 33 or an operation command directly inputted via e.g. the keyboard 24. A video controlling section 35 generates video signals for causing the monitor 32 to display a print source image or a simulated image as an expected finished print image during a pre-judge printing operation for e.g. color correction and to display also the graphic data sent from the GUI section 33. A print data generating section 36 generates print data suited for the print exposing unit 14 mounted in the print station 1B, based on final image data whose image processing has been completed. A formatter section 37 formats raw image data or the finally processed image data into a format writable in e.g. a CD-R, in accordance with a customer's request.

Referring more particularly to the image inputting section 31, in case the photographic image recording media is a film 2*a*, this image inputting section 31 transmits scanned data scanned in a pre-scanning mode and a main scanning mode, separately to the memory 30, to effect a preparatory operation suited for each particular purpose. Whereas, in case the photographic image recording media is a memory card 2*b*, if the inputted image data contains thumbnail image data (low resolution data), the section 31 transmits this thumbnail data to the memory 30 separately from the main data (high resolution data) of the photographic image, so that the thumbnail data may be used for e.g. list (summary) display on the monitor 23. On the other hand, if no thumbnail data are contained therein, the image inputting section 31 creates reduced images from the main data and send these as thumbnail data to the memory 30. Further, this image inputting section 31 is connected also to a device commonly known as photographic print order receiving device, for automatically receiving a customer's order for prints. Then, when the image inputting section 31 receives print order data relating to a print size, a number of prints to be made, etc., image attribute data relating to photographic condition and photographic image data, the image inputting section 31 transmits the image data to the memory 30, and transmits the print order data and the image attribute data to the print managing section 32, respectively. In the case of an order for standard photos, then, the print order data relating to e.g. a print size, the number of prints, etc. and also, if necessary, the image attribute data relating to presence/absence of flash photography, photographic-subject information, the type of camera used, etc. will be sent to the print managing section 32 in response to an operator's input operation to that effect via e.g. the keyboard 24.

The print managing section 32 includes a print order processing unit 60 for managing the print size, the number of prints, etc. and an image processing unit 70 for effecting photo retouching operations such as color correction, filtering (for color softening or sharpness adjustment) on the image data mapped in the memory 30. In the instant embodiment, the print managing section 32 further includes a face detecting unit 80 configured to detect a face area (s) in the photographic image (data) mapped in the memory 30 and to provide face detection information such as a coordinate position, orientation or the like of the detected face area. This face detecting unit 80 can be a standard general-purpose type detecting unit. In this embodiment, however, the detecting unit 80 employed is adapted for detecting a seemingly face like area in the photographic image and then outputting, as the face detection information, face area data comprising a face position and a face size (vertical and horizontal dimensions of a rectangular pixel area relative to the face position as the point of reference) and face orientation data expressing the orientation (vertical or reverse vertical orientation) of the face as a face angle. Various algorithms are known for detecting a face area from image data. For instance, reference can be made to Japanese Patent Application "Kokai" No. 11-339084, Japanese Patent Application "Kokai" No. 2000-99722 or Japanese Patent Application "Kokai" No. 2000-22928.

Figure 4:
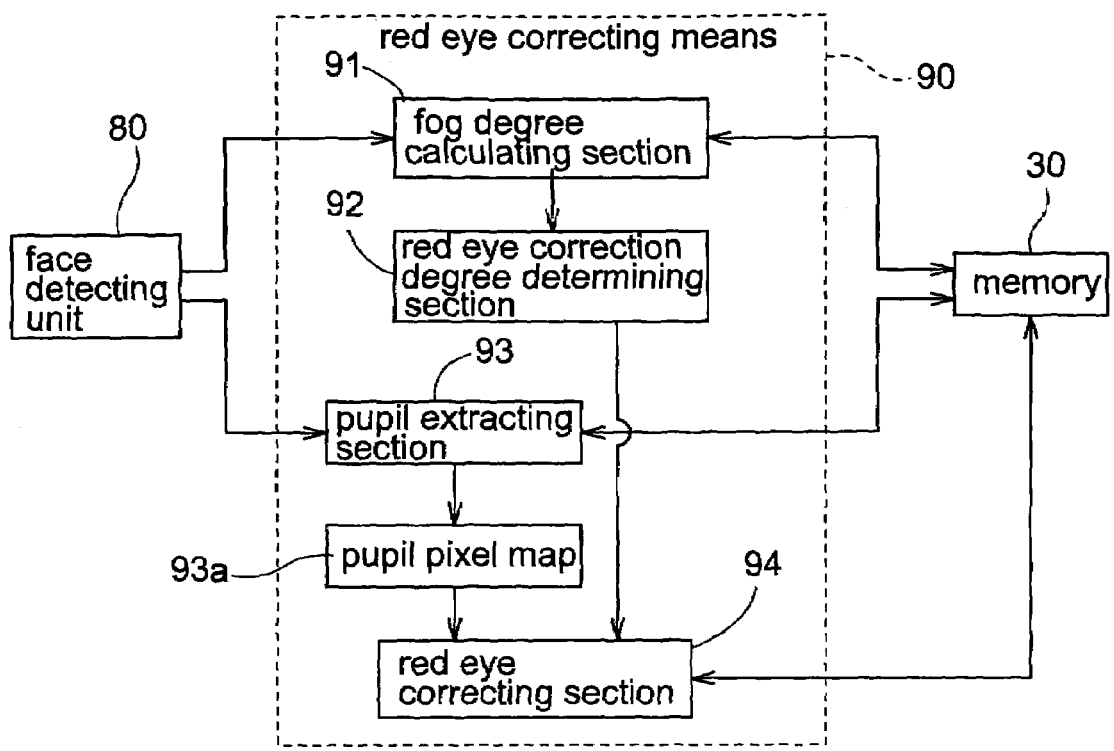
FIG. 4 is a block diagram showing functional blocks of a red eye correcting means.

In addition to the above-described functions, the image processing unit 70 further includes a red eye processing means 90. As shown in FIG. 4, this red eye processing means 90 includes a fog degree calculating section 91 for calculating a degree of red fog present in the face area, based on values of pixels included in the face area obtained from the face detecting unit 80, a red eye correction degree determining section 92 for determining a red eye correction degree based on the determined fog degree, a pupil area extracting section 93 for extracting a pupil area from the face area obtained from the face detecting unit 80, and a red eye correcting section 94 for effecting a red eye correction on the pupil area based on the red eye correction degree determined by the red eye correction degree determining section 92.

Figure 5:
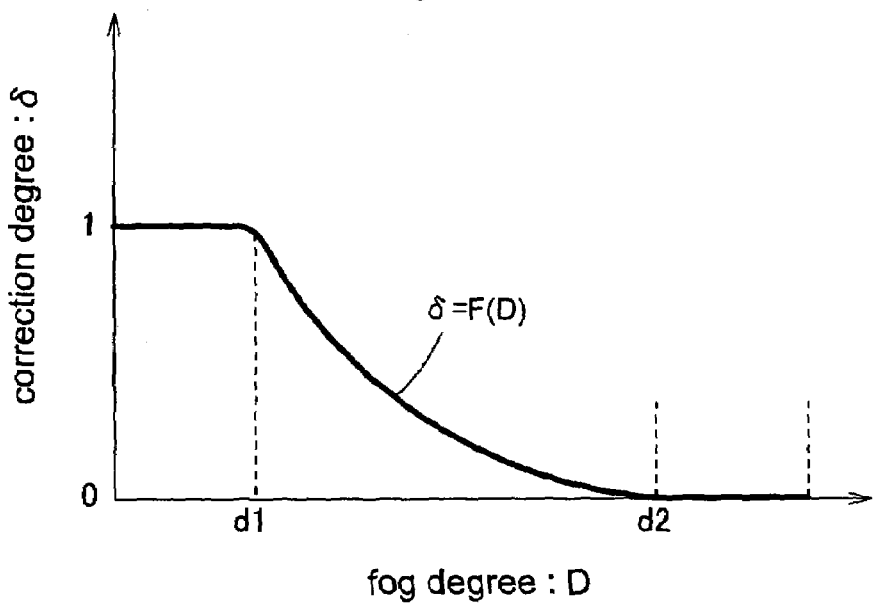
FIG. 5 is an explanatory view for explaining a function for determining a correction degree based on a fog degree.

More particularly, the fog degree calculating section 91 is configured to obtain first an average value: Rave of red component density values of all pixels (color pixels having R, G, B color pixel values) constituting the photographic image data mapped in the memory 30 based on the face area data provided from the face detecting unit 80 and an average value: Bave of blue component density values of all the pixels and then to determine a difference value: D=Rave−Bave as the red fog degree. Needless to say, it will be advantageous of this fog degree is normalized with e.g. a maximum value or an average density value. In this embodiment, however, for the purpose of simplicity of explanation, the difference value: D is employed as the fog degree. Then, based on the fog degree: D obtained by the fog degree calculating section 91, the red eye correction degree determining section 92 determines a red eye correction degree (correction intensity): δ which varies according to the fog degree: D obtained by the fog degree calculating section 91 as illustrated in the graph of FIG. 5 for example. In this example shown in FIG. 5, a function: F describing the relationship between the fog degree: D and the correction degree: δ provides a correction degree: δ of "1" in the area below a lower limit value: d1 of the fog degree (i.e. the maximum correction intensity) and provides a correction degree: δ of "0" in the area above an upper limit value: d2 of the fog degree (i.e. the minimum correction intensity, that is, no correction at all). The lower and upper limit values: d1 and d2 can be obtained statistically and experimentally. In the case of 8-bit color data, for example, the difference value ranges from 0 to 255. Hence, a certain percentage of such range will be used as a reference for determining these limit values.

Prior to effecting a red eye correction, it is necessary to extract pixels included in the pupil area as the red eye area. To this end, the pupil extracting section 93 is provided. In this embodiment, as the information concerning the position and angle (orientation) of the face area of the photographic image is available from the face detecting unit 80, the pupil extracting section 93 can employ a relatively simple algorithm for this purpose of pupil area detection. According to a typical such algorithm, skin color pixels are extracted by using a skin color detecting condition based on density values of the respective color components and white color (white eye) pixels are extracted by using a white color detecting condition determined, depending on the density values of the extracted skin color pixels and then pupil area pixels can be determined, taking into consideration geometric shape properties of the pupil. Instead, any other appropriate pupil detecting algorithm known in the art can be employed. Based on the pupil are pixels determined in the manner above, the pupil extracting section 93 subsequently creates a pupil pixel map 93a defining the positions of the pupil pixels.

After the creation of the pupil pixel map 93a defining the positions of the pupil pixels in the manner described above, the red eye correcting section 94 storing an appropriate red eye correction algorithm corrects the red eye pixels, i.e. the pixels included in the pupil area when this pupil area has been determined as a red eye area. This determination of a pupil area being a red eye or not can be made based on a similar condition to that used for the determination of red fog described above, or, more preferably, on a more strict determination condition.

In this embodiment, the red eye correction effected by this red eye correcting section 94 is effected actually by reducing chroma of the red eye pixels. In doing this, the chroma reduction is made according to the following formula:

$$d=(R+G+B)/3$$

$$R'=\delta Xd+(1-\delta)R$$

$$G'=\delta Xd+(1-\delta)G$$

$$B'=\delta Xd+(1-\delta)B$$

That is to say, by changing the density values (R, G, B) of the red eye pixel to (R', G', B') respectively, the red eye pixel can be corrected to a natural pupil color (of course, the amount of chroma reduction will vary depending on the value of δ). In the case of this calculation formula, when the correction degree: δ is "1", no correction at all is to be effected. When the correction degree: δ is "0", the correction degree is maximum, that is, the color is to be changed to grey. Only in extreme cases, the correction degree: δ has the value of "1" or "0" or a value adjacent thereto. In more general red eye correction situations, this the correction degree: δ will have a value ranging from 0.45 to 0.55.

The above-described technique of red eye correction relying on the reduction of chroma of a red eye pixel does not necessarily work well in case the actual color of the pupil is light blue or green. In such case, the process may employ a different red eye correction technique in which the brightness values of a red eye pixel are approximated to brightness values of a pupil which are inputted and set in advance by the optionally provided pupil color setting section.

Figure 6:
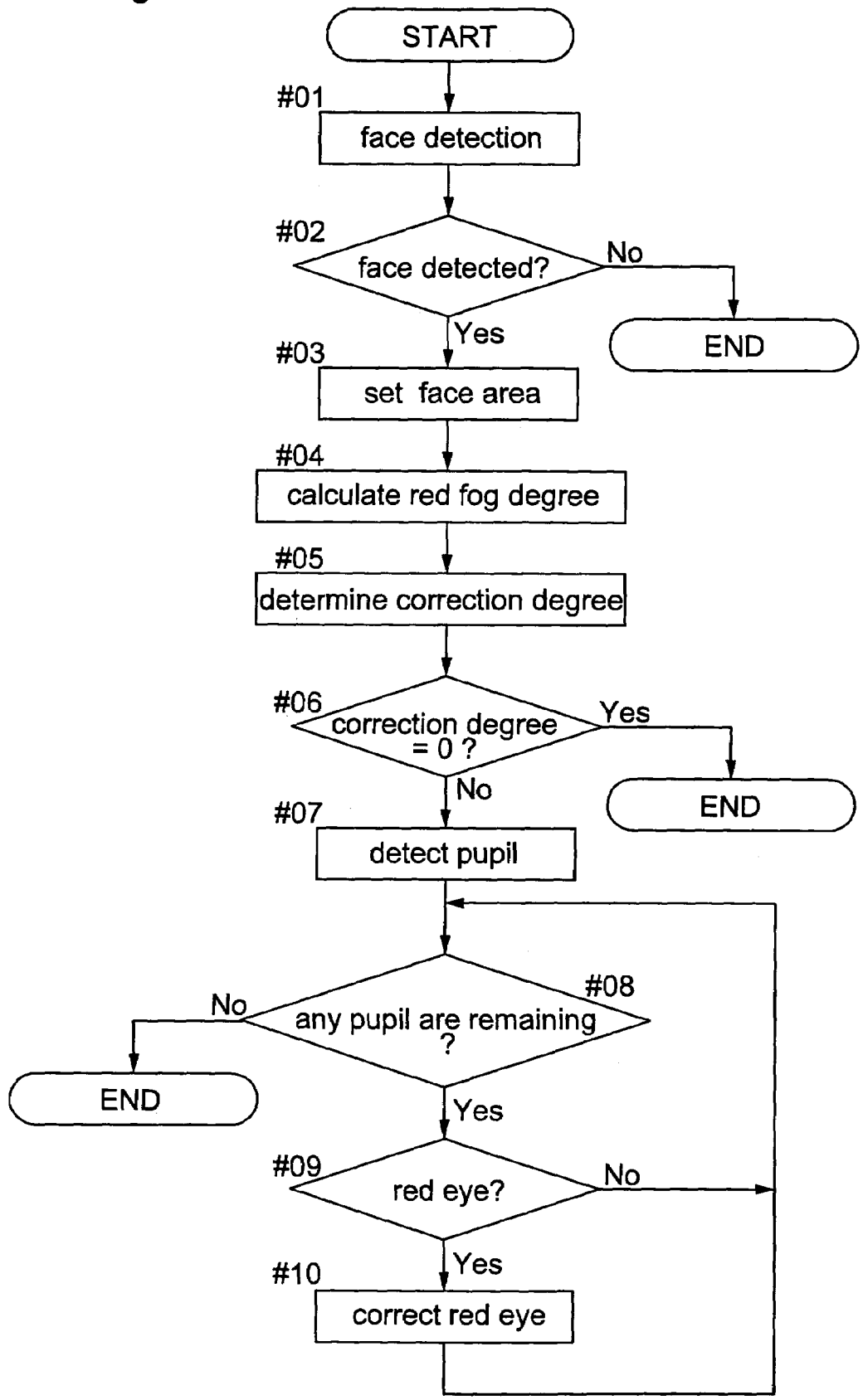
FIG. 6 is a flowchart illustrating a red eye correcting process.

Next, the process of red eye correction by the red eye correcting means 90 having the above-described construction will be described with reference to the flowchart shown in FIG. 6 which illustrates the general flow of this operation. First, by using the photographic image data mapped in the memory 30, the face detecting unit 80 effects the face detection and outputs face detection information to the red eye correcting means 90 (step #01). If the red eye correcting means 90 determines, based on the face detection information received, that the subject photographic image does not include any face area, this red eye correction process for this photographic image is terminated (NO branched from step #02). On the other hand, if it is determined that a face area (s) is included in the photographic image (YES branched from step #02), such face area is set relative to the photographic image data mapped on the memory 30 (step #03). In this embodiment, if a plurality of faces (face areas) are detected in a single photographic image, the process selects one of them as a "main" face area depending on the size and the position of the face and effects the following correction degree determining step base on this particular face area and then effects a red eye correction for pupils of all the face areas. Instead, the pupil eye detection and the red eye correction can be effected independently for each and every detected face area based on the correction degree determination to be detailed below.

After the setting of the face area, by using the pixels included in this face area, the fog degree calculating section 91 obtains an average value: Rave of red component density values of all these pixels and an average value: Bave of blue component density values of the same and then determines a difference value: D=Rave—Bave as the red fog degree (step #04). In succession, the red eye correction degree determining section 92 determines a correction degree: δ from the determined fog degree: D by using e.g. the function shown in FIG. 5 (step #05). If this determined correction degree has the value "0", it may be judged that with high probability at least the face area has a red fog. Then, if a red eye correction is effected even if the pupil has the red eye phenomenon, the correction will result in visual congruity between the color of pupil and the colors of the entire face after the correction, thus leading to color imbalance in the entire photograph. Hence, in view of this, the process terminates this routine (YES branched from step #06) to cancel the red eye correction. On the other hand, if the correction degree has a value other than "0", the red correction should be effected with an appropriate intensity depending on the correction degree if the pupil has a red eye phenomenon. Hence, the process moves to the next step where the pupil extracting section 93 effects the pupil extraction (step #07). Upon completion of pupil detection, the position of the pupil area is written into the pupil pixel map 93a. Then, with reference to this pupil pixel map 93a, the process designates and processes one pupil area after another for red eye determination. In this, the process first checks whether there remains any pupil area yet to be processed or not (step #08). If such pupil area not yet processed is found (YES branched from step #08), the process designates this pupil area and effects the red eye determination thereon (step #09). This red eye determination is effected based on a determination condition of a ratio of red components of the pixels in the designated pupil area exceeding a predetermined value. If the designated pupil area is not determined as a red eye (NO branched at step #09), the process jumps to step #08 to check whether there remains any pupil area yet to be processed or not. On the other hand, if the designated pupil area is determined as a red eye (YES branched at step #09), the red eye correcting section 94 effects the red eye correction by using the correction formula described above with employing the correction degree: $\delta$ determined at step #05 (step #10). The process repeats the steps #08 through #10 until exhaustion of pupil area(s) (e.g. usually 2 times in case one face area is detected).

Incidentally, in the image processing from steps #01 through #10, the present invention further proposes that the process from the face detection to the correction degree determination be effected with using low resolution data and the process from the pupil detection to the red eye correction be effected with using high resolution data.

In either case, the image data which have been subjected to an appropriate degree of red eye correction will be then subjected to a necessary image processing and converted into print data to be transmitted to the print exposing unit 14, which then exposes a print paper P based on this print data, thereby to produce a finished print.

In the foregoing embodiment, the face area detection from the photographic image is effected automatically by the face detecting unit 80. Alternatively, an operator can manually designate a face area with the photographic image being displayed on the monitor.

What is claimed:

1. A method for correcting red eye phenomenon in a photographic image, comprising the steps of:
    calculating a degree of red fog present in a face area, based on values of pixels included in the face area selected from the photographic image;
    determining a red eye correction degree based on the determined fog degree;
    extracting a pupil area from the face area; and
    effecting a red eye correction on the pupil area based on the determined red eye correction degree.

2. The method according to claim 1, wherein at said fog degree calculating step, a difference value between an average value of red component density values of the pixels included in the face area and an average value of blue component density values of the same is determined as said fog degree.

3. The method according to claim 1, wherein said eye correction degree determining step cancels the red eye correction for a face area having a fog degree exceeding a predetermined value.

4. The method according to claim 1, wherein in case the photographic image includes a plurality of face areas, the red eye correction degree determination and the red eye correction are effected for each and every face area.

5. The method according to claim 1, wherein in case the photographic image includes a plurality of face areas, the correction degree determination is effected for one of the face areas and the correction degree determined for this face area is used for red eye correction of all the face areas.

6. A computer-readable medium comprising computer-executable instructions for correcting red eye phenomenon in a photographic image, said computer-executable instructions being for:
    calculating a degree of red fog present in a face area, based on values of pixels included in the face area selected from the photographic image;
    determining a red eye correction degree based on the determined fog degree;
    extracting a pupil area from the face area; and
    effecting a red eye correction on the pupil area based on the determined red eye correction degree.

7. An image processing apparatus for correcting red eye phenomenon in a photographic image, comprising:
    a fog degree calculating section for calculating a degree of red fog present in a face area, based on values of pixels included in the face area selected from the photographic image;
    a red eye correction degree determining section for determining a red eye correction degree based on the determined fog degree;
    a pupil area extracting section for extracting a pupil area from the face area; and
    a red eye correcting section for effecting a red eye correction on the pupil area based on the determined red eye correction degree.

8. The apparatus according to claim 7, wherein in said fog degree calculating section, a difference value between an average value of red component density values of the pixels included in the face area and an average value of blue component density values of the same is determined as said fog degree.

9. The apparatus according to claim 7, wherein said red eye correction degree determining section cancels the red eye correction for a face area having a fog degree exceeding a predetermined value.

10. The apparatus according to claim 7, wherein in case the photographic image includes a plurality of face areas, the red eye correction degree determination and the red eye correction are effected for each and every face area.

11. The apparatus according to claim 7, wherein in case the photographic image includes a plurality of face areas, the correction degree determination is effected for one of the face areas and the correction degree determined for this face area is used for red eye correction of all the face areas.

12. The method according to claim 2, wherein said eye correction degree determining step cancels the red eye correction for a face area having a fog degree exceeding a predetermined value.

13. The method according to claim 2, wherein in case the photographic image includes a plurality of face areas, the red eye correction degree determination and the red eye correction are effected for each and every face area.

14. The method according to claim 3, wherein in case the photographic image includes a plurality of face areas, the red eye correction degree determination and the red eye correction are effected for each and every face area.

15. The method according to claim 2, wherein in case the photographic image includes a plurality of face areas, the correction degree determination is effected for one of the face areas and the correction degree determined for this face area is used for red eye correction of all the face areas.

16. The method according to claim 3, wherein in case the photographic image includes a plurality of face areas, the correction degree determination is effected for one of the face areas and the correction degree determined for this face area is used for red eye correction of all the face areas.

17. The apparatus according to claim 8, wherein said red eye correction degree determining section cancels the red eye correction for a face area having a fog degree exceeding a predetermined value.

18. The apparatus according to claim 8, wherein in case the photographic image includes a plurality of face areas, the red eye correction degree determination and the red eye correction are effected for each and every face area.

19. The apparatus according to claim 9, wherein in case the photographic image includes a plurality of face areas, the red eye correction degree determination and the red eye correction are effected for each and every face area.

20. The apparatus according to claim 8, wherein in case the photographic image includes a plurality of face areas, the correction degree determination is effected for one of the face areas and the correction degree determined for this face area is used for red eye correction of all the face areas.

21. The apparatus according to claim 9, wherein in case the photographic image includes a plurality of face areas, the correction degree determination is effected for one of the face areas and the correction degree determined for this face area is used for red eye correction of all the face areas.

* * * * *